Figure 1:
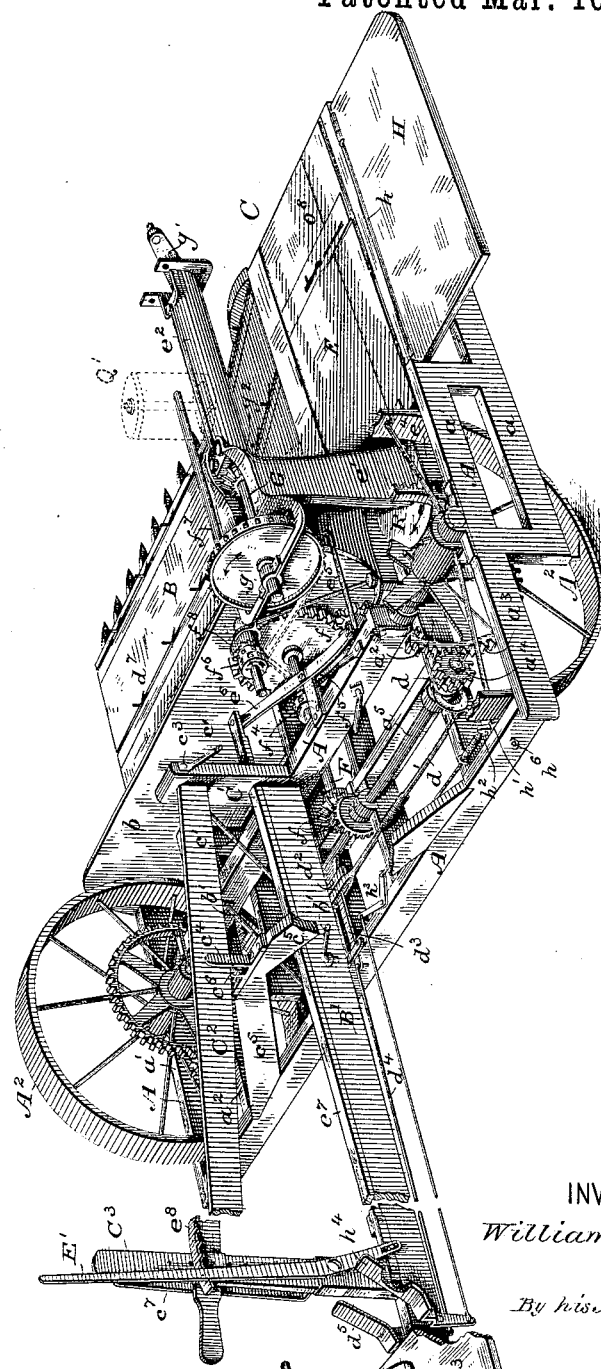

(Model.)

13 Sheets—Sheet 1.

W. LOTTRIDGE.
GRAIN BINDER.

No. 338,091. Patented Mar. 16, 1886.

WITNESSES
Wm A. Skinkle
Harry King

INVENTOR
William Lottridge
By his Attorneys (Model.)

13 Sheets—Sheet 2.

W. LOTTRIDGE.
GRAIN BINDER.

No. 338,091. Patented Mar. 16, 1886.

WITNESSES
Wm A. Skinkle
Harry King

INVENTOR
William Lottridge
By his Attorneys (Model.)

W. LOTTRIDGE.
GRAIN BINDER.

No. 338,091. Patented Mar. 16, 1886.

WITNESSES
Wm A. Skinkle
Harry King

INVENTOR
William Lottridge
By his Attorneys
Rencwison & Rencwison (Model.)

13 Sheets—Sheet 4.

W. LOTTRIDGE.
GRAIN BINDER.

No. 338,091. Patented Mar. 16, 1886.

WITNESSES
Wm A. Skinkle
Harry King

INVENTOR
William Lottridge
By his Attorneys
Pancuisen & Pancuisen

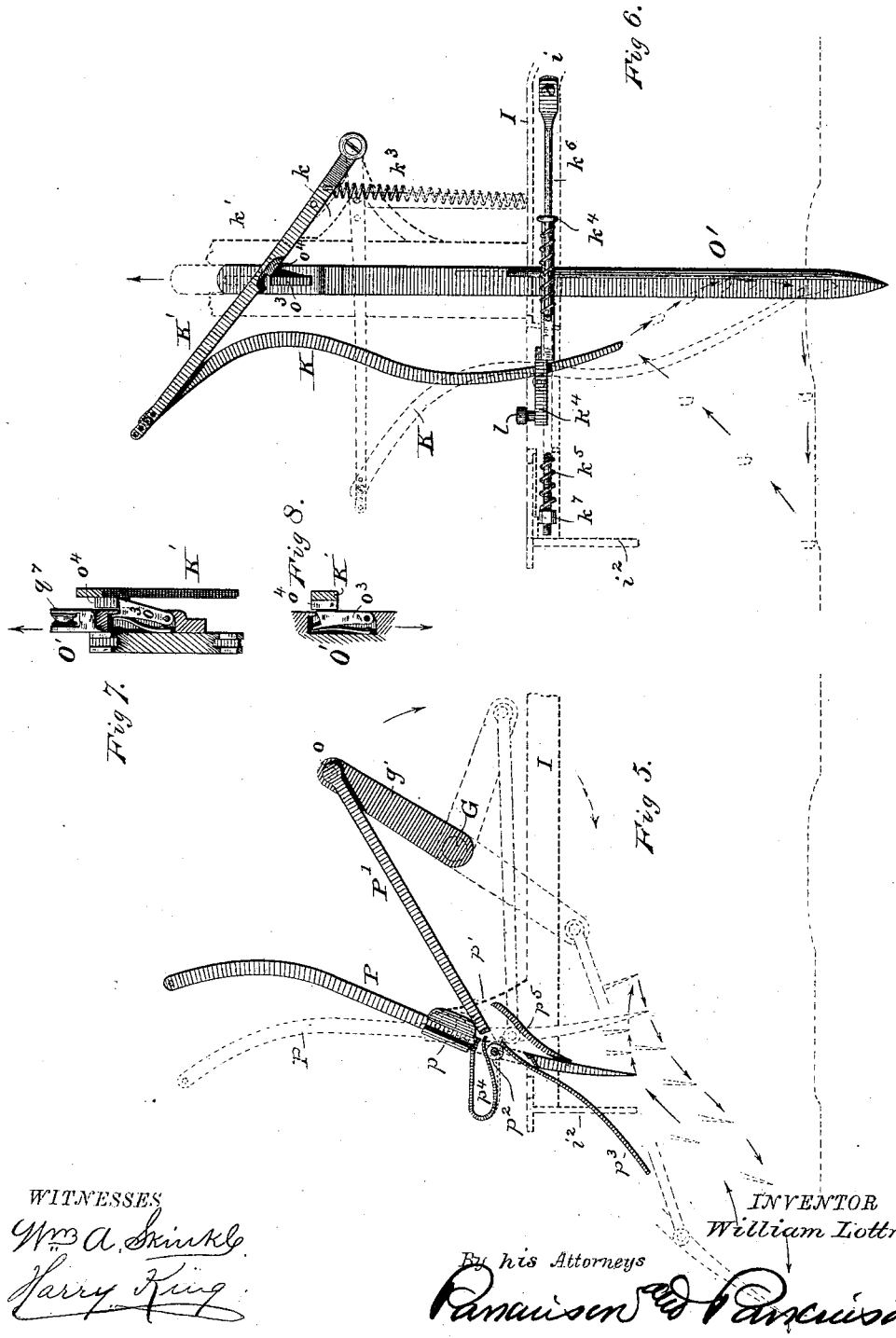

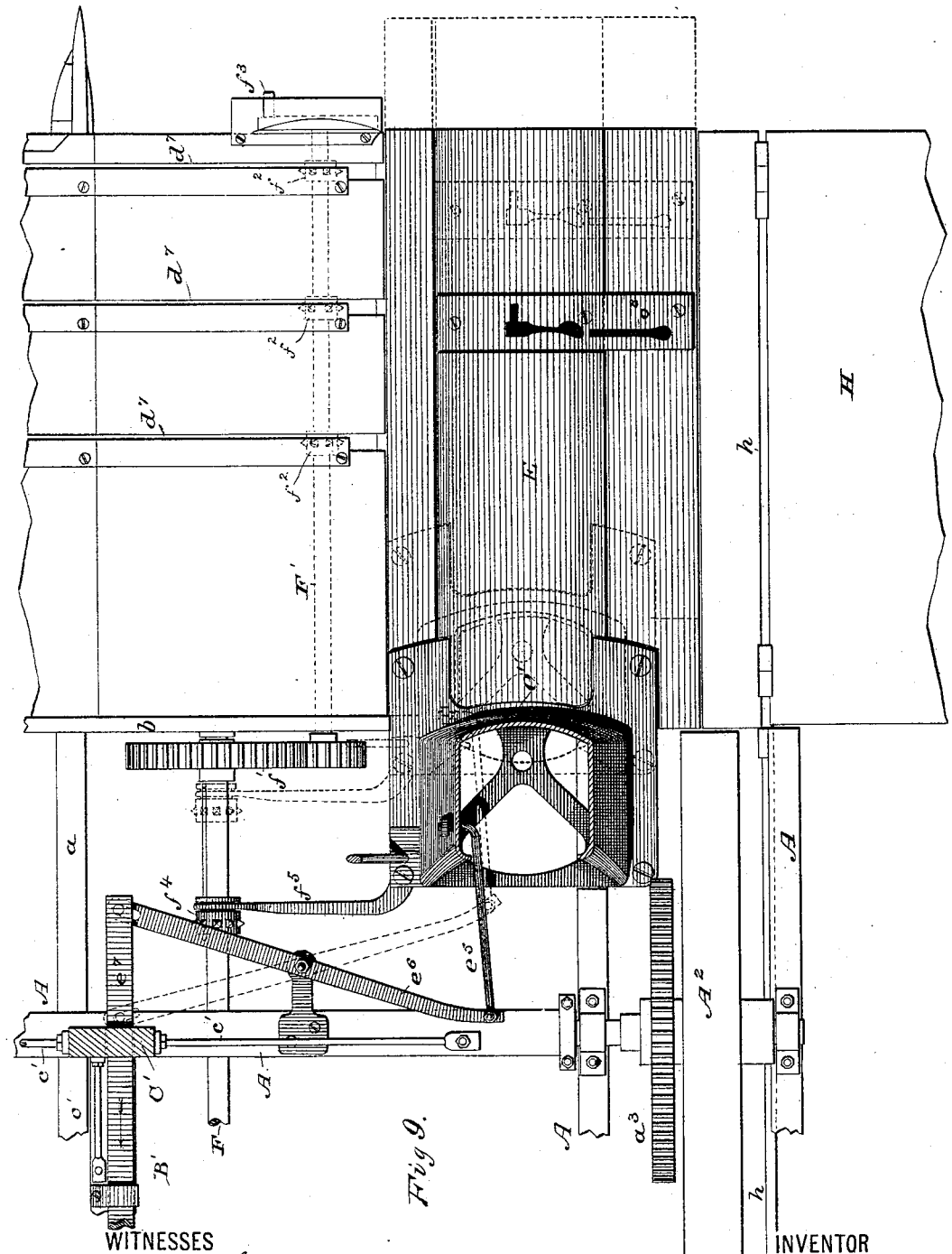

(Model.)
W. LOTTRIDGE.
GRAIN BINDER.
No. 338,091. Patented Mar. 16, 1886.
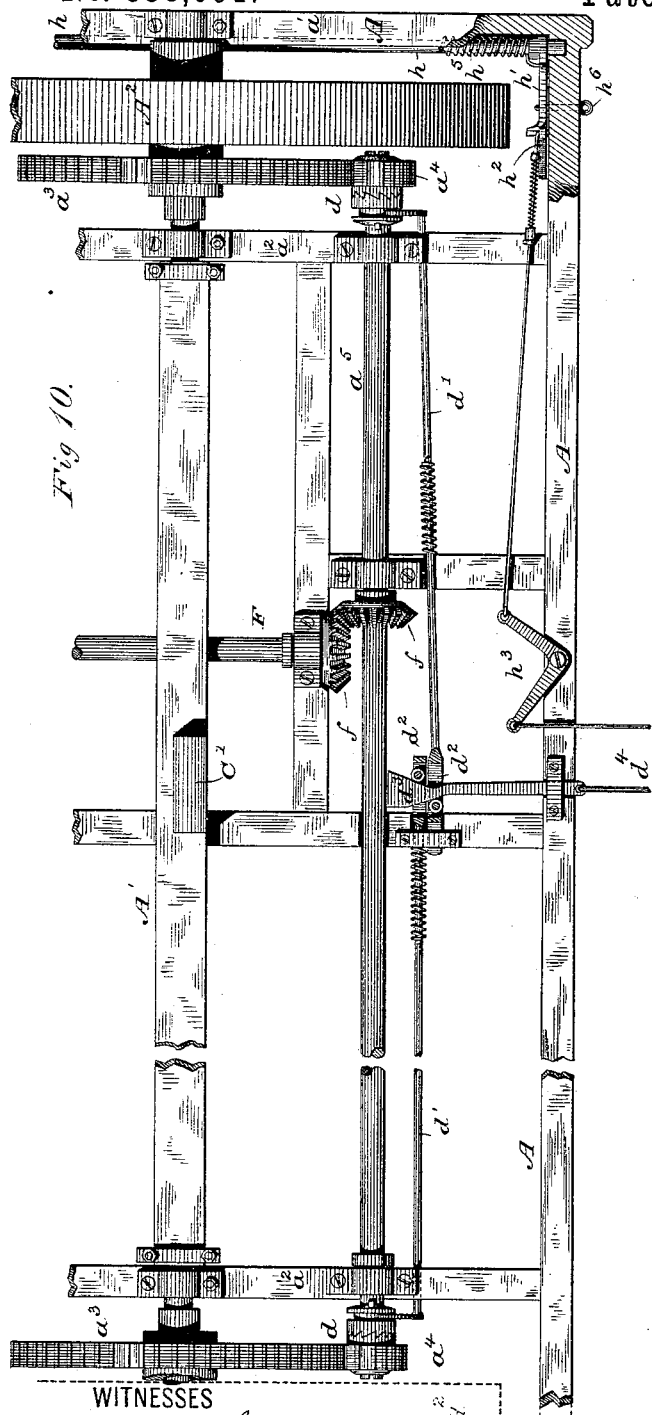
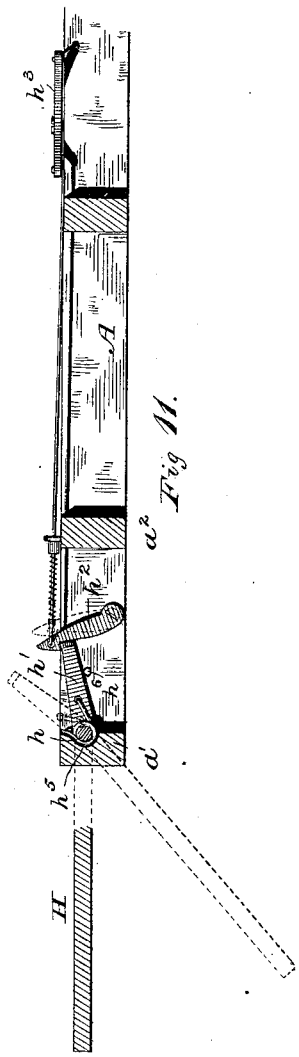
WITNESSES
Wm A. Skinkle
Harry King
INVENTOR
William Lottridge
By his Attorneys (Model.)
13 Sheets—Sheet 8.
W. LOTTRIDGE.
GRAIN BINDER.
No. 338,091. Patented Mar. 16, 1886.
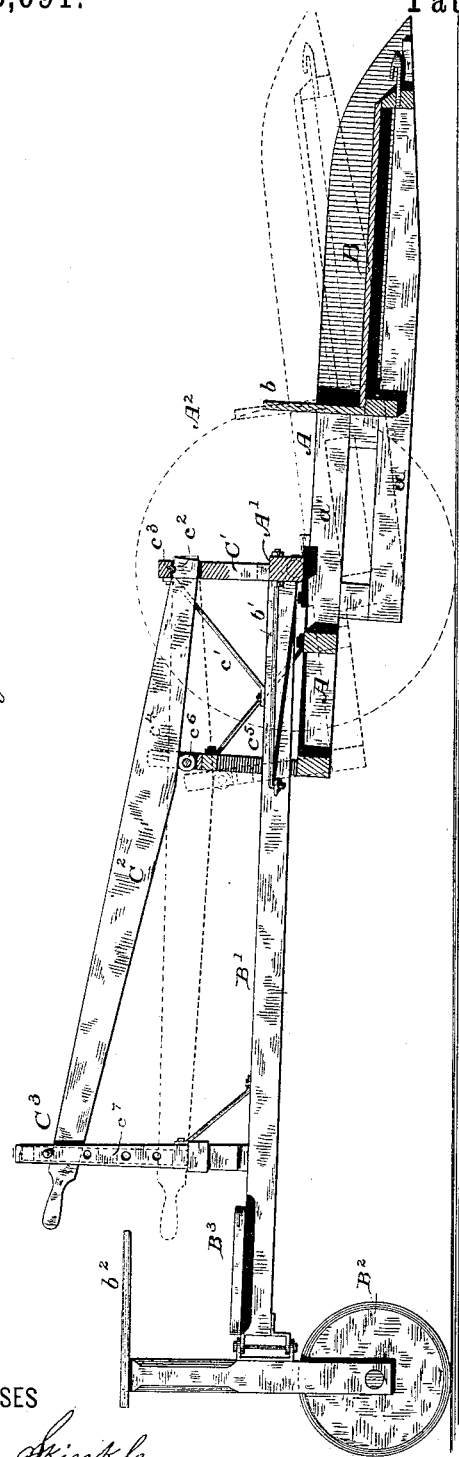
WITNESSES
Wm A. Skinkle
Harry King
INVENTOR
William Lottridge
By his Attorneys (Model.)
13 Sheets—Sheet 9.
W. LOTTRIDGE.
GRAIN BINDER.
No. 338,091. Patented Mar. 16, 1886.
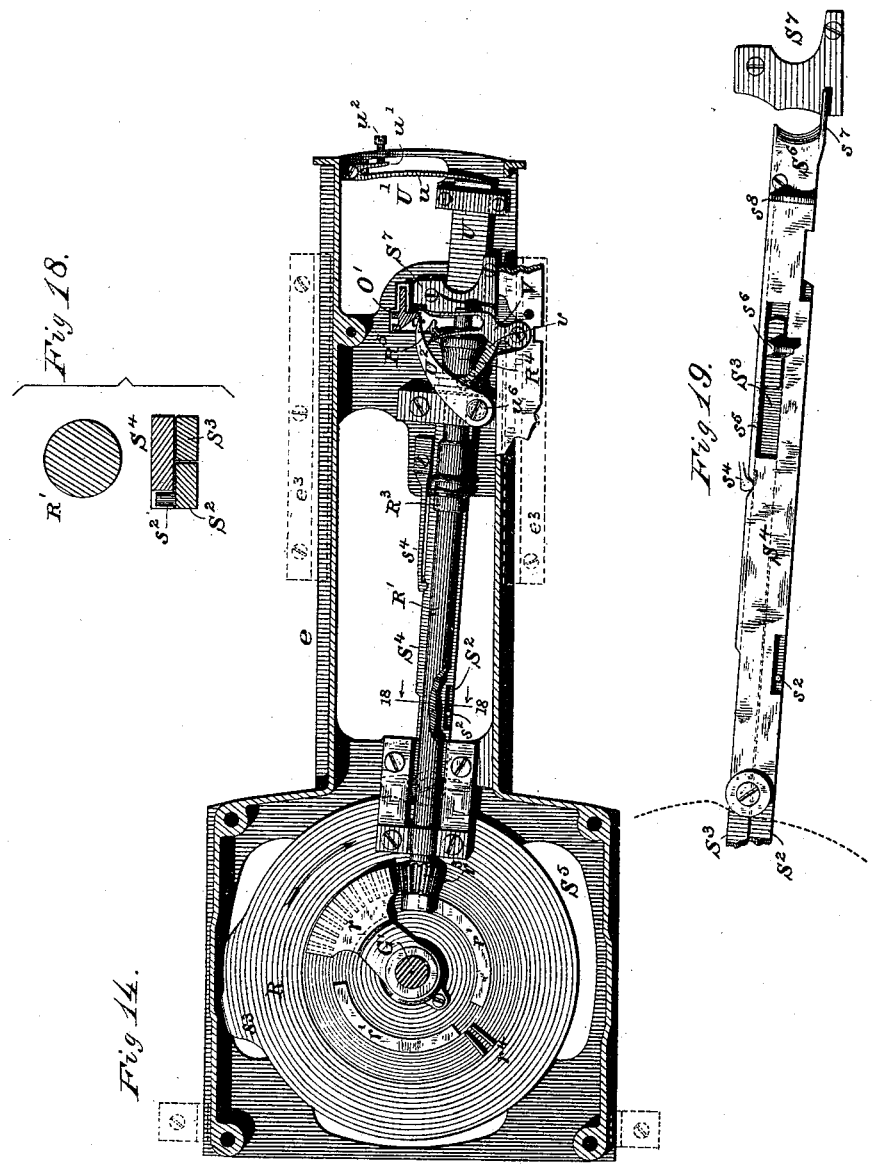
WITNESSES
INVENTOR
William Lottridge
By his Attorneys (Model.)

13 Sheets—Sheet 10.

W. LOTTRIDGE.
GRAIN BINDER.

No. 338,091. Patented Mar. 16, 1886.

WITNESSES
Wm A. Skinkle
Harry King

INVENTOR
William Lottridge
By his Attorneys (Model.)
13 Sheets—Sheet 11.
W. LOTTRIDGE.
GRAIN BINDER.
No. 338,091. Patented Mar. 16, 1886.
WITNESSES
Wm A. Skinkle
Harry King
INVENTOR
William Lottridge
By his Attorneys (Model.)

13 Sheets—Sheet 12.

W. LOTTRIDGE.
GRAIN BINDER.

No. 338,091. Patented Mar. 16, 1886.

WITNESSES
Wm A. Skinkle
Harry King

INVENTOR
William Lotridge
By his Attorneys (Model.)

W. LOTTRIDGE.
GRAIN BINDER.

No. 338,091.  Patented Mar. 16, 1886.

WITNESSES
Wm A. Skinkle
Harry King

INVENTOR
William Lottridge
By his Attorneys
Parkinson & Parkinson

UNITED STATES PATENT OFFICE.

WILLIAM LOTTRIDGE, OF OSAGE, IOWA, ASSIGNOR OF TWELVE-EIGHT-EENTHS TO MARTIN V. NICHOLS AND CYRUS H. COTTER, BOTH OF SAME PLACE.

GRAIN-BINDER.

SPECIFICATION forming part of Letters Patent No. 338,091, dated March 16, 1886.

Application filed August 1, 1883. Serial No. 102,525. (Model.)

*To all whom it may concern:*

Be it known that I, WILLIAM LOTTRIDGE, of Osage, in the county of Mitchell and State of Iowa, have invented certain new and useful Improvements in Grain-Binders, of which the following is a specification.

My invention has for its object, in part, to secure an uninterrupted passage for the moving grain, except in so far as the binding devices may temporarily stop it in performing their office from the divider end to the stubble end of the platform without retardation by the presence of an elevator; in part to adapt a low-level thrust-cut harvester to automatic binding, and in part to general improvements upon the structure of the binder and of the knotting and holding devices forming elements thereof; and it consists in the combination of a harvester-platform practically level along its length, binding apparatus at the stubble end thereof, a wheel-frame and carrying-wheels behind said platform, a thrust-pole extending behind said frame and supported at its rear end by a swiveled caster, a driver's stand at said rear end, and a system of levers controllable by the driver on his stand, whereby the platform and wheel-frame may be tipped upon the axle to raise and lower the knives, and the binding apparatus thrown in and out of gear to start or stop the machine at will; in improved tipping mechanism to start the binding apparatus; in a novel organization of tripping and shipping mechanism, whereby the binding apparatus is brought into action, and at the same moment the packers thrown out; in a cord-knotter of improved construction; in the combination, with the knotter and holder, of a gear and cam wheel of novel construction in certain features, whereby said knotter and holder are positively actuated, and in various other combinations and details of construction hereinafter described and claimed.

Figure 2:
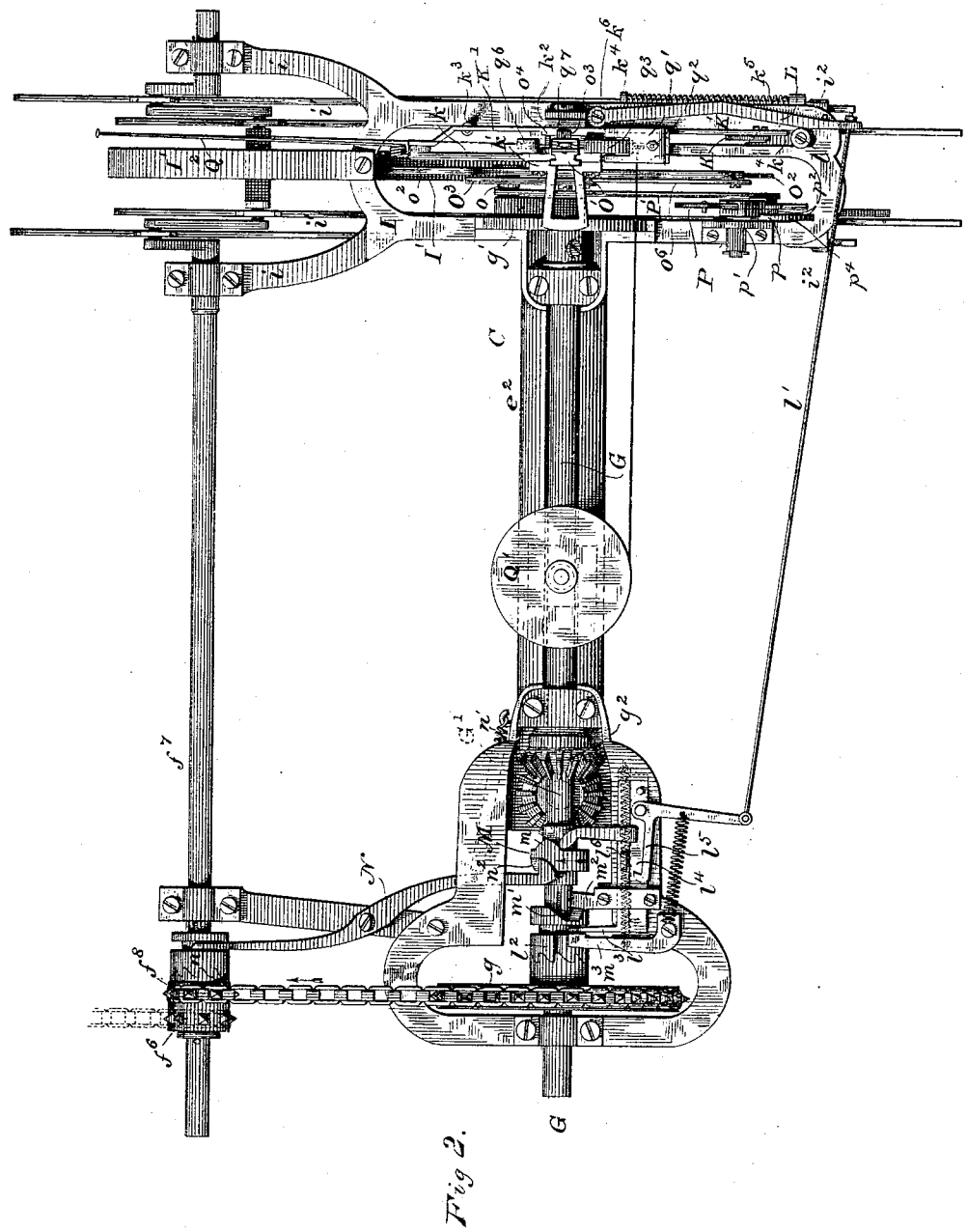
Figure 3:
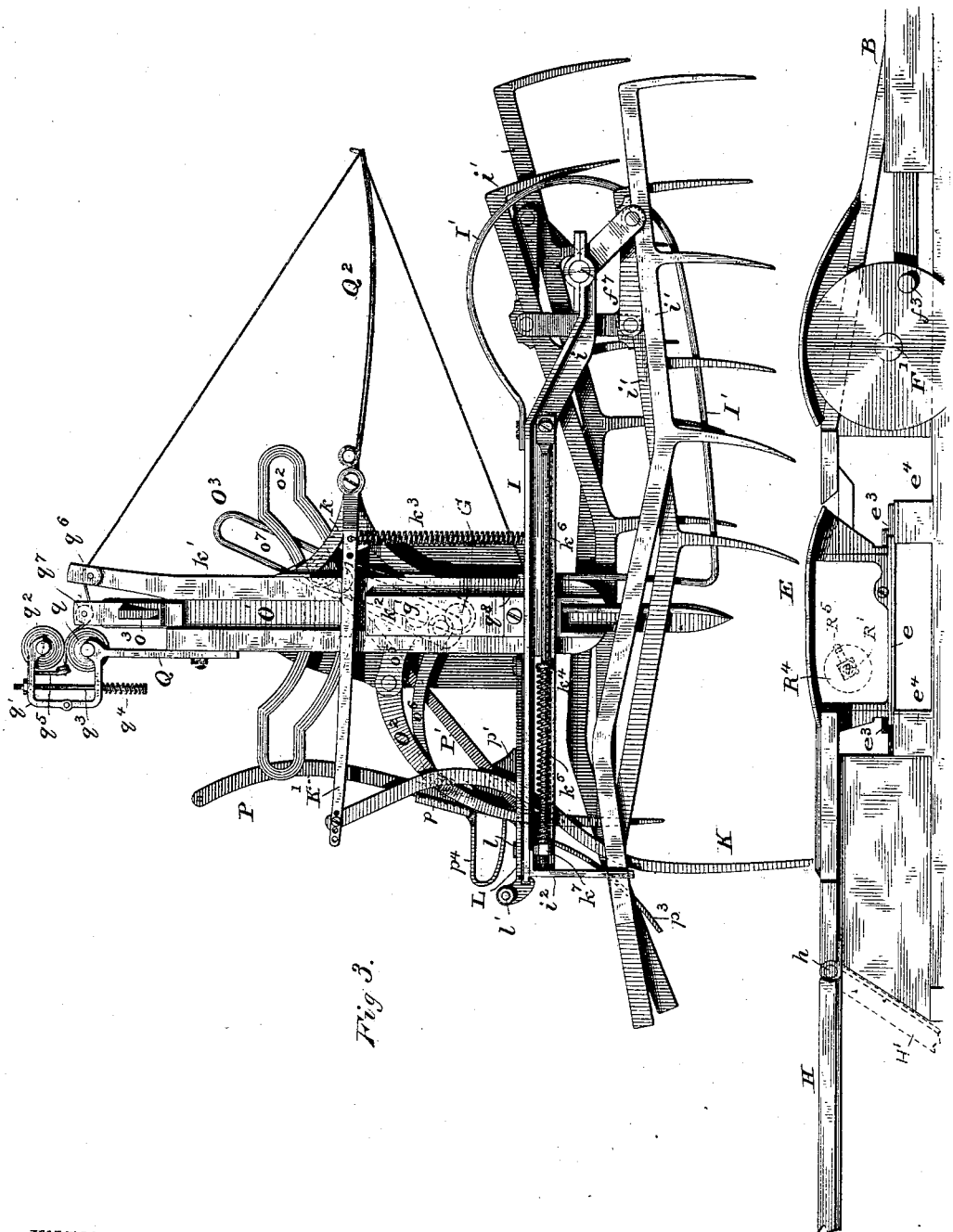
Figure 4:
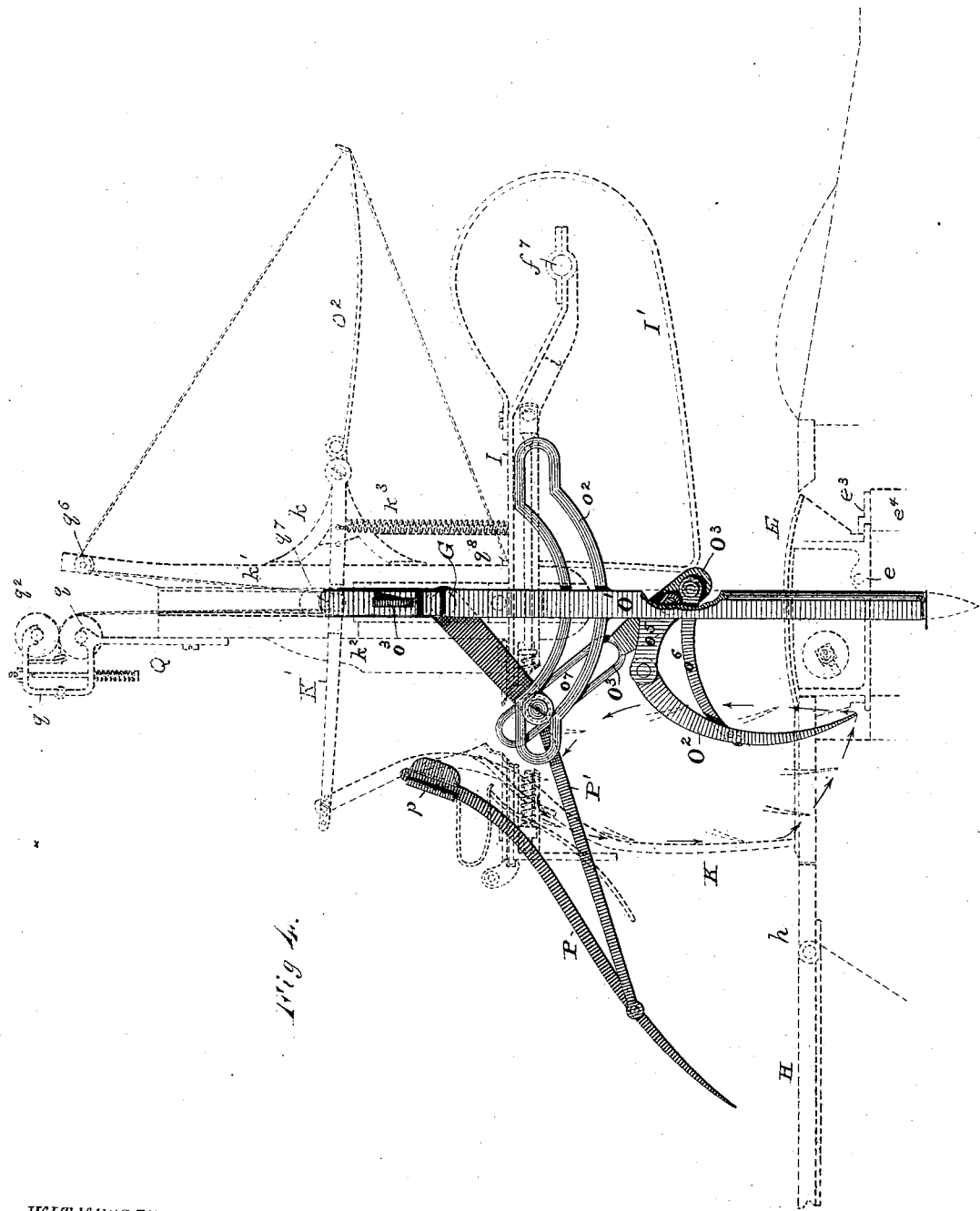
Figure 15:
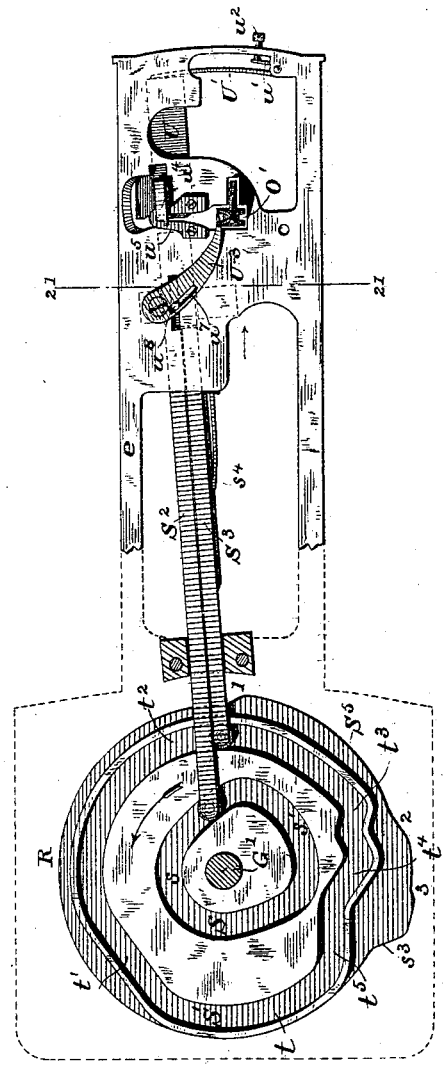
Figure 21:
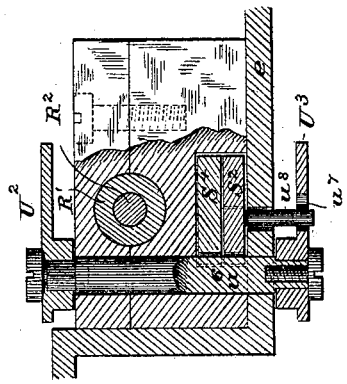
Figure 20:
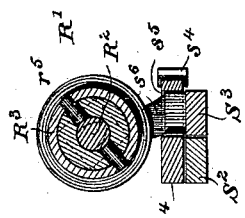
Figure 17:
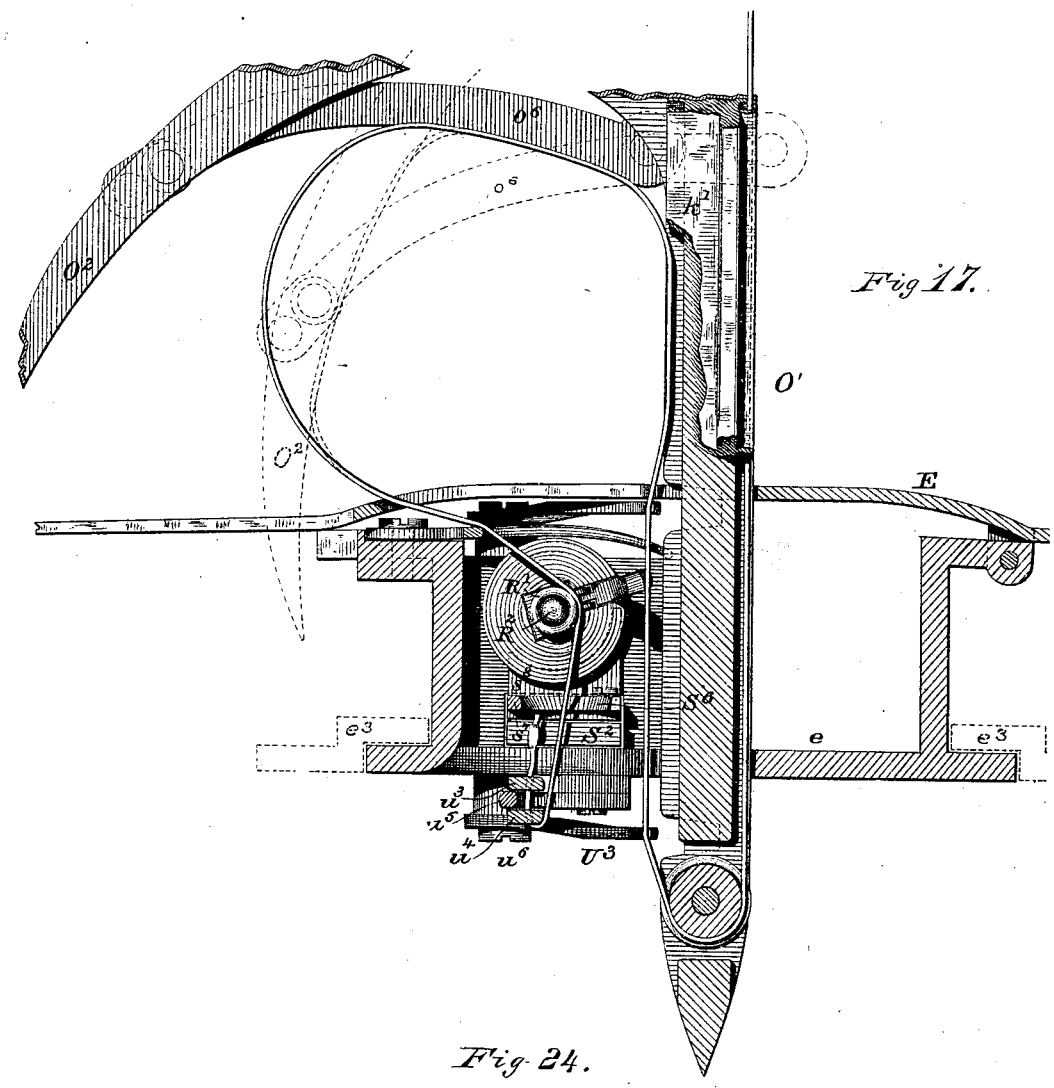
Figure 24:
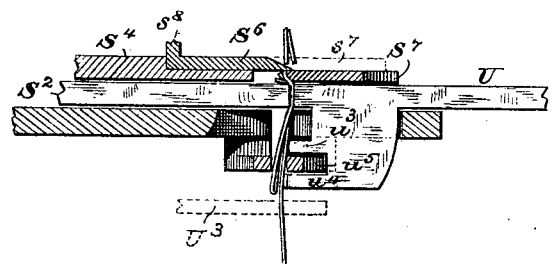
Figure 25:
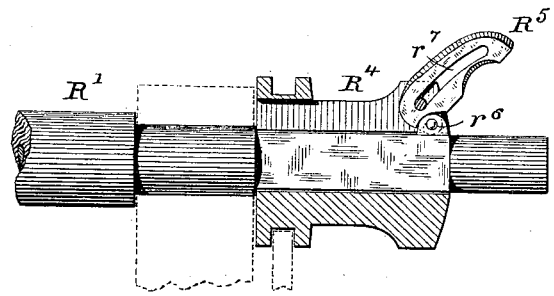
Figure 26:
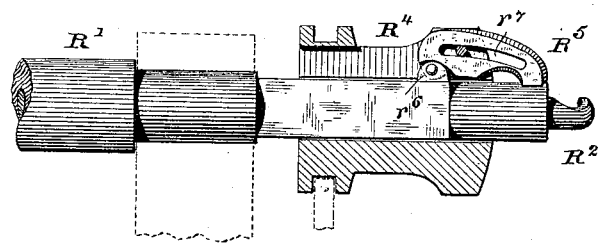
Figure 27:
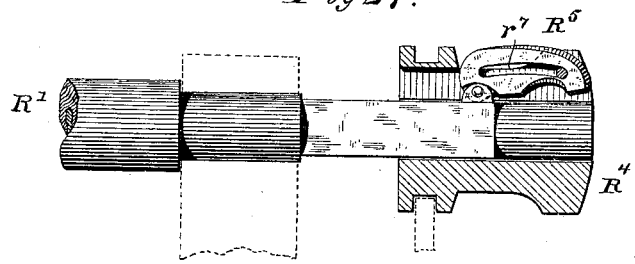

In the drawings, Figure 1 is a perspective view of a thrust-cut harvester embodying my invention, the binding arm or needle, packers, tripping-arm, and bundle separator or ejector being removed for the sake of perspicuity; Fig. 2, a top plan view of the binding arm or needle, packers, tripping-arm, and bundle-separator, the shafts by which they are driven, and the tripping-clutch and shippers by which their movements are timed and controlled, detached from the harvester, and enlarged; Fig. 3, a side elevation of the foregoing parts, showing also the binding-table and a portion of the platform; Figs. 4, 5, and 6, diagrammatic views of the binder arm or needle, the compressor, the bundle-separator, and the trip arm or lever, to illustrate the positions which they assume in operation; Figs. 7 and 8, details of the binder arm or needle to show the action of the spring dog or pawl by which the tripping-arm is raised to permit the clutch to disengage; Fig. 9, a top plan view of the binding-table and portion of the grain-platform, and mechanism by which said table is moved transversely of the platform, the superposed parts being omitted; Fig. 10, a plan of the prime gearing in the wheel-frame from which the binder and the platform-rake are conveniently driven, and of the devices for controlling said gearing, and Fig. 11 a detail in elevation of certain of the parts shown in the foregoing; Fig. 12, a side elevation, with platform in section, of the entire harvester-frame, omitting the binding mechanism, and Fig. 13 a detail of certain devices carried upon the tongue to control the engagement or disengagement of the prime pinions with the gears on the carrying-wheels; Fig. 14, a top plan view of the knotter and upper cord-placer, and the gear and cam wheel by which they are operated; and Fig. 15 a bottom plan view of the same gear and cam wheel and box or casing which carries the knotter, showing part of the cord-holder and the lower cord-placer; Fig. 16, a side elevation, partly in section, of the parts represented in the two foregoing figures, with the needle-arm in position at the moment it has carried the band around the gavel; Fig. 17, an elevation from the front of the machine of the foregoing parts, greatly enlarged beyond the scale in the preceding figures; Fig. 18, a vertical transverse section on the corresponding line represented in Fig. 14 through the knotter-spindle, movable cutter, sliding bar of the holder, and second sliding bar which actuates the retracting-hook of the knotter; Fig. 19, a top plan view of the cord-cutter, including both the stationary and movable members thereof detached and enlarged; Fig. 20, a transverse section, enlarged, on the line indicated in Fig. 16, through the knotter, and the three sliding bars beneath, forming members, respectively, of the cord-clamp, the cord-cutter, and the knotter-actuating mechanism; Fig. 21, a second transverse section, likewise on an enlarged scale, through certain of the above parts and the block which supports or guides them, including also the two cord-placers; Figs. 22 and 23, enlarged details of the pinion operating the knotter, its delay-shoes, the rack for rotating it, and the delay-tracks for holding it locked in position; Fig. 24, a longitudinal section transversely to the part shown in Fig. 17 through the holder; and Figs. 25, 26, and 27 enlarged details of the knotter in different stages of action.

A is a rectangular wheel-frame, carrying upon under-hung projecting sills $a$ the platform B and binding-frame C, which are thus brought in front of the wheel-frame proper and on a lower level, the wind-board $b$ serving to divide the platform from said frame, and the frame post or standard $e'$ of the binder forming a practical continuation of such wind-board, as will hereinafter appear. A wooden axle, $A'$, extends across and above the wheel-frame, and at its ends has metallic stub-axles strapped to the end sills, $a'$, and parallel cross-pieces $a^2$ of said frame, so as to allow a pivoted movement of the latter. Drive and carrying wheels $A^2$ turn upon the stub-axles between each end sill and the adjacent parallel cross-piece, and, by means of gears $a^3$, which they carry, drive pinions $a^4$, ratchet-clutched to a through-shaft, $a^5$, permitting each drive-wheel to lock independently without affecting the action of the other upon the gearing, but requiring both to work in their forward movement, and thus in the present instance avoiding side draft. At the center of the axle is a mortise, receiving the forward end of a thrust tongue or pole, B', braced and made fast in its seat by means of hounds $b'$, pivoted to the axle by clamping-bolts, and hooking into eyes on the sides of said tongue, so that the latter may be removed by simply unhooking the hounds therefrom. At its rear end the tongue is supported upon a swiveled caster, B², controllable by a tiller, $b^2$, and just within the caster is a foot-stand, B³, for the driver. In front of this stand the horses will be attached in the usual manner practiced in headers and other thrust-cut harvesters. A short post, C', is bolted to the axle at the point where the tongue joins it, being braced by rods $c'$ passing from its top diagonally to the axle on either side, and also to the tongue. At its head this post is mortised to receive the forward end of the tipping-lever C², which in practice may enter said mortise loosely, as in the case of the tongue, and be secured by means of a notch, $c^2$, on its upper edge, catching upon the round through-bolt $c^3$, which secures the upper ends of the two brace-rods $c'$, running to the axle from the top of the post, and is inserted at such a point that it passes across the upper end of said mortise and just within it, where it can be engaged by the notch in the lever. From the post the tipping-lever runs rearwardly above the tongue through a keeper, $c^4$, supported upon truss-bars $c^5$, rising from the rear sill of the wheel-frame and bridging said tongue. For ease of work, the bottom of this keeper is provided with an anti-friction roll, $c^6$, upon which rests and works the bottom of the lever. At its rear end the lever passes alongside a standard, C³, rising from the draft-tongue just in front of the driver's stand, and is there retained by a second elongated keeper, $c^7$, having perforations, matching like perforations in the standard, through which a bolt may be passed to retain the lever at any point to which it may be depressed along said standard, and thus hold the front of the platform at such elevation as it may have been brought to by the tilting of the lever.

Ratchet-clutches $d$, which engage with the prime pinions, are each yoked to spring-seated sliding rods $d'$, extending inwardly toward the center of the wheel-frame until they meet and slightly pass each other, being formed at this point with enlarged and slotted heads $d^2$, and steadied by entering a guideway in a contiguous cross-sill of the frame. Through the slotted heads passes a wedge-bar, $d^3$, connected by an inhooking link, $d^4$, with a treadle, $d^5$, just in front of the driver's stand, so that by depressing said treadle the wedge part of the bar will be drawn transversely of the slotted heads, acting against anti-friction rolls properly mounted therein, and will retract the sliding rods against the stress of their springs, opening the clutches and throwing the machine out of gear, in which condition it may be kept for transportation or otherwise by means of a catch, $d^6$, which snaps over the end of the treadle, but may be released by the toe of the driver at any moment.

The platform, as stated, is in front of the carrying-wheels, and preferably depressed below the general plane of the wheel-frame proper, with the wind-board between to prevent the grain being thrown back. It is provided with any suitable raking mechanism— as, for instance, chain-rakes having teeth projecting upwardly through slots $d^7$—and it is substantially level along its length except for a slight rise at its delivery end, intended in part to serve to strip the teeth of the rakes at this point, and in part to allow sufficient space above the ground for the effective mechanism necessarily located underneath, and shielded by the binding-table to which it delivers. This binding-table E and the binder-frame, including a subtending arm or casting, $e$, bearing said table, standard, or post, $e'$, at the rear, composed of a metallic shell of considerable dimensions, rounded in front and extending substantially across the table, so as to serve as a continuation of the platform wind-board, and an overhung bracket-arm, $e^2$, from said post or standard, and the mechanism carried by these parts, are supported upon ways $e^3$ upon two transverse sills, $e^4$, of the platform-frame, so as to be moved along the delivery end of said platform to accommodate longer or shorter grain. In order to control this movement, a link, $e^5$, connects the standard with a lever, $e^6$, pivoted upon the wheel-frame, and at its power end coming directly in front of the post C' upon the axle, and slotted to receive a pin from the end of a bar, $e^7$, confined to the top of the tongue by clips or keepers, which permit it to slide endwise, and passing through a mortise in the foot of the post at the end of said tongue to reach and make connection with the lever, which will be sprung into engagement with the pin, or in dismantling the machine sprung out therefrom, that the sliding bar may be taken away with the tongue. At its rear end the sliding bar is controlled by a lever, E', pivoted to the standard on the tongue on that side away from the tilting-lever, and latching into a segment-rack, $e^8$, borne by said standard, so that by manipulating this lever the binding table can be set at any desired position.

The prime pinion-shaft $a^5$ drives a countershaft, F, by means of beveled gears, $f$. At its front end this counter-shaft has a spur-wheel, $f'$, which engages with a pinion upon the end of the shaft F', running beneath the delivery end of the platform, and carrying along its length sprocket-wheels $f^2$, to drive the chain belts or other provisions if a different form of rake is used, and at its front end having the wrist-pin $f^3$, by which the sickle is moved. Upon the counter-shaft is also mounted a sprocket-wheel, $f^4$, feathered thereto, so as to slide longitudinally thereof while being driven. A groove in this sprocket-wheel receives a yoke from an arm, $f^5$, projecting rigidly from the foot of the post $e'$ on the binder-frame, so that whenever said post and binding-frame are moved back and forth the sprocket-wheel will partake of such motion. A chain from the sprocket-wheel is carried over a loosely-running sprocket-wheel, $f^6$, borne upon a shaft, $f^7$, which turns in bearings upon brackets from the binder-frame, and overhangs the inner or delivery end of the platform considerably in advance of the bracket-arm from the post, that it may serve to drive the packing devices as presently described.

Another sprocket-wheel, $f^8$, lying alongside the last named and rigid therewith, or made integral, communicates by chain belt with a larger sprocket-wheel, $g$, loose on the end of a horizontal shaft, G, carried in the overhung bracket-arm of the binder and driving by a crank, $g'$, at its front end the needle and compressor. This shaft also, by means of beveled gears $g^2$, communicates motion to a vertical shaft, G', inclosed within the post, and carrying at its foot beneath the level of the binding-table a gear and cam wheel by which the knotting and holding devices are to be operated.

Outside of the binding-table at the end of main frame is a sheaf-board, H, hinged at the same level with said table by means of a rod, $h$, to which it is fixedly attached and which works in suitable bearings. This rod extends rearwardly inside the end sill until it reaches the rear sill of the wheel-frame, where it has a crank-arm, $h'$, bearing at its end a lug over which catches a pawl, $h^2$, to hold the sheaf-board in horizontal position. The pawl connects by a spring-pressed sliding rod urging it constantly forward into engagement with one arm of an elbow-lever, $h^3$, into the other arm of which hooks a link from a treadle, $h^4$, in front of the driver's stand, but on the opposite side of the tongue from that treadle which serves to throw the machine out of action. By pressing upon this treadle the driver can at any time release the sheaf-board, so that it may sink upon its axis to dump a sheaf or sheaves. As soon, however, as it has been freed from their weight, it will be returned to horizontal position by means of a winding-spring, $h^5$, upon its pivot-rod, and the pawl, by this time released by the driver, will snap over the crank-arm on said rod and hold the board as before.

To prevent the spring from carrying the sheaf-board or dumping-board past the horizontal in this return movement, a stop, $h^6$, is provided against which the crank-arm comes as soon as it has reached the proper position for engagement with the pawl. This stop is made in the form of a removable bolt, so that in transportation it can be withdrawn, when the spring will carry the board to a perpendicular and hold it there as the crank-arm will come against the inner surface of the end sill.

The features thus far described comprise the general structure of the machine, the regular gearing, and the devices or expedients which relate particularly to its special organization as a thrust-cut machine.

I will now proceed to describe the binding instrumentalities and their relations, which instrumentalities, as before intimated, are of general application and not limited to employment with a thrust-cut machine alone, although such is considered the most desirable embodiment. Suspended from the front end of the overhung arm of the binder-frame is an open rectangular sub-frame, I, having at its inner or platform end arms $i$, which afford the front bearings for the packer-shaft, before alluded to. Between said arms the shaft has cranks—in the present instance four, although they may differ in number, according to the number of packers desired—set equidistant around the axis. Each crank is pivoted to the body of a packing-arm, $i'$, near the receiving end of said arm, and each arm is provided for a part of its length back from said end with teeth, curved in the direction of their working movement, so that when advancing to receive a fresh load of grain they may tend to ride over, rather than to catch into it, until their movement is reversed. At the heel ends the arms are guided in elongated slots pierced in hangers $i^2$ at the stubble end of the rectangular supporting-frame, the purpose being that they shall not only have an orbital movement due to the resultant action of the cranks and of the guides, but that when being carried out over the platform they may, if the teeth come in contact with grain, rise at the heel ends, and so permit the teeth to ride easily over such grain until the moment when they are expected to catch into it. Between the two pairs of packers is an elastic presser, I', curved, as shown, to bear upon the waist of the grain as it is urged along beneath, prevent it from coming in contact with the shank of the packer-arms as it accumulates, and to strip it from the packer-teeth as they rise in the return movement.

The packers receive the grain as it is brought by the platform-rakes and force it, wisp by wisp, against a tripping-arm, K, whereby the binding devices are started. Herein this tripping-arm is pivoted to a bar, K', hinged to a bracket, $k$, projecting from one side of the needle-guide $k'$, and is held normally down in a horizontal position against a ledge or shoulder, $k^2$, on the face of said guide by a spring, $k^3$, to keep the tripping-arm at the lower extreme of its movement. Above the packing-space, but below its own pivot, the tripping-arm is permitted to play back and forth in a slotted way in the rectangular frame, subject, however, to the resistance of a block, $k^4$, which is constantly pressed in toward the needle or binding-space by means of a spring, $k^5$, coiled about a screw-threaded rod, $k^6$, and seated against a nut, $k^7$, on said rod, whereby its resistance can be varied. A lever, L, is pivoted to one side of the guideway for the tripping-arm, and is bent so as to cross said guideway behind the block, and a pin or anti-friction roll, $l$, projecting up from the block through the guideway comes against this inclined portion as the tripping-arm retreats before the incoming gavel, and, finally, when the resistance of the spring has been sufficiently overcome, forces said lever aside. In this movement the lever carries with it a link, $l'$, which trips the binding mechanism, causing it to be set in motion.

The special tripping devices adopted for the purpose are as follows: The sprocket-wheel upon the needle-shaft in the overhung arm is clutched to said shaft by a sliding clutch, $l^2$, urged into engagement by a spring-pressed sliding bar, $l^3$, to which it is yoked. Alongside this bar is a second sliding bar, $l^4$, carrying a pawl, $l^5$, which has a lever-arm connected to the link from the bent lever moved by the tripping-arm, and is controlled by a spring, so as to hold said bent lever across the guideway for said tripping-arm and itself normally into position for action.

Upon the spring-pressed sliding bar $l^3$, which operates to close the clutch, is a lug, $l^6$, over which the pawl can take whenever the bar $l^4$, which supports it, is sufficiently advanced. An arm from this latter bar extends out over the needle-shaft and there rests against one face of a collar, M, which on said face has one rounded projection, $m$, but as to the remainder of the face is a plane. As long as the end of the arm is bearing against the depressed portion of the face—that is, the plane surface—the pawl and the sliding bar which supports it will be advanced sufficiently by the force of the spring which holds the pawl, or by any other suitable spring, to enable said pawl to catch over the lug on the clutch-bar; but when, in the course of the revolution of the shaft, the rounded projection of the collar is brought against the end of the arm, it will be moved back, carrying with it the pawl and also the clutch-bar, opening the clutch, and the shaft will, therefore, come to a stop with the arm still resting upon said projection. If, now, the tripping-arm is pressed back sufficiently to disengage the pawl from the lug, the clutch-bar will be released and will fly forward toward the wheel, carrying the clutch into engagement, and the shaft will be started.

That the clutch may not be accidentally disengaged when once engaged, it is made with a notch, $m'$, in the inner edge of its hub, which notch at the moment it is to be opened comes opposite a rigid bar or finger, $m^2$, permitting the clutch to be drawn back; but while it is in revolution this bar or finger rests against the plane portion of its edge and positively prevents it from being disengaged until the notch again comes around. A spring-stop, $m^3$, also rests against the periphery of the clutch-hub, and at the moment it is disengaged falls into a recess thereon, so as to hold it from displacement until again tripped.

It is necessary to stop the packers while the needle is passing through the grain; but until it enters or leaves the mass the needle-shaft and the packers should have concurrent motion. The packer-shaft is therefore clutched to its driving sprocket-wheel by a sliding clutch, $n$, yoked to a pivoted lever, N, which reaches up to the needle-shaft and rests at its power end upon that face of the collar M opposite to the one which operates the disengaging-bar, and is held thereagainst by a spring, $n'$. Said second face has a recess, $n^2$, of considerable length opposite the disengaging projection on the other face, and while the end of the lever is sunk into that recess the packing-arms will be in action; but just after the disengaging-arm has ridden over its projection, and the needle has, therefore, made a portion of its descent, the lever itself is lifted out of its recess and rides upon a plane surface, thus disengaging the packer-clutch and stopping the packer-arms. As the shaft completes its revolution, the lever first falls into its recess, starting the packer-arms just after the needle has commenced to rise, and then the disengaging-arm rides up upon its projection, unclutching the needle-shaft and leaving the end of the lever about midway of its recess, with the packer-shaft still rotating, and so continuing until the mechanism is a second time tripped, when the same operation will be repeated. The needle-shaft has at its outer end a crank, $g'$, with a wrist-pin, $o$. The needle $O'$ slides in ways in a vertical standard, $k'$, on the end of the overhung bracket-arm, and has attached to it a transverse bar, $o^2$, slotted in such manner as to leave horizontal recesses at the ends, or wings connected by a curved track, said curve being described on such an arc that when the needle is down, the wrist-pin, which enters the slot, and thereby actuates the needle, will sweep through it from one wing to the other without imparting any motion, thus giving a long period of delay. The downward movement will cease when the wrist-pin leaves the corresponding wing—in the present instance that on the platform side. Then after the interval of delay, as the wrist-pin strikes the other wing, it will raise the needle a portion of the distance, and next re-entering the curved track, which is now reversed to its sweep, will raise said needle a further distance until it reaches the center of said track, at which moment the disengaging operation takes place and it comes to a stop. When the wrist-pin next starts, it will travel over the remaining portion of the curved track, depressing the needle a portion of the way, and then entering the first wing will complete the downward traverse imparted to the needle.

In a recess in the front face of the needle, near its top, or in a block attached to said front face, is pivoted a spring-dog, $o^3$, pressed normally outward until stopped by a finger from its body coming against a pendent ledge at the head of said recess. This dog, as the needle-arm rises, strikes an inwardly-projecting flange, $o^4$, from the lever to which the tripping-arm is pivoted, as said lever is rested upon the shoulder or ledge in front of the guideway, and it lifts the lever thereby until the tripping-arm has been carried clear of the freshly-bound sheaf and brought inward by the retraction of the spring-block, against which it is seated, with its point close against the needle, when the dog rides off the end of the flange and the lever drops, carrying the tripping-arm down again into position to stop the incoming gavel. As the needle on the other hand descends, this dog, striking the flange first close at its pivoted end, will be closed into the recess in which it plays and will not interfere with the lever, but immediately passing it will spring out again and be in position to raise it on the succeeding ascent of the needle. On the needle is an offset, $o^5$, to which is pivoted a curved compressor-arm, $o^2$, on the side away from the platform. Between its pivot and its point it is connected by a curved link, $o^6$, with the shorter arm of a lever, $O^3$, which has its fulcrum-pivot upon the needle or upon the body of the offset therefrom, and is provided in its longer or power arm with an elongated slot, $o^7$, to receive the wrist-pin from the needle-shaft crank, so that as the crank revolves said wrist-pin will swing the lever to one side or the other, opening and closing the compressor, the arrangement and relation of parts being such that while the needle is descending the compressor is wide open, but as it is approaching the end of its movement and the wrist-pin is leaving the depressing-wing the compressor begins to close, and during the sweep of the wrist-pin through the curved delay-track the closing is completed and the gavel compressed. In such movement the point of the compressor passes through and plays in a slot, $o^8$, formed in the platform for the purpose.

In order to push away or separate bound sheaves from gavels undergoing the binding operation, a tine, P, is arranged to slide at its heel end in a guide, $p$, pivoted to a low standard, $p'$, upon the inner side of the rectangular sub-frame I, and beneath this guide is connected by a link, $P'$, with the wrist-pin on the needle-shaft crank, the same wrist-pin which actuates the needle and the compressor. The pivot-pin which connects this link to the tine is continued through the body of the latter, and upon the other or inner side carries an anti-friction roll, $p^2$, which in the upward movement of the tine as it is drawn upon by the rotation of the crank travels over a camway or track, $p^3$, not reaching the top of such track at the moment the crank comes to rest, but when the crank starts again, swinging on from the vertical position in which it had stopped, the tine is still further lifted a slight distance, and the anti-friction roll ascends to the head of the track, pushes aside a spring-switch, $p^4$, and drops upon a second lower and shorter track, $p^5$, when the motion of the wrist-pin becomes such as to immediately cause the tine to descend and enter into the sheaf and push it out away from the binding apparatus. This action takes place during the binding operation, and is for the purpose of forcing the sheaf previously bound away from the gavel being bound with which it is frequently tangled.

To insure the delivery of the bound sheaf upon the ground and to carry it out away from the track of the machine or of the team, the sheaf-board already mentioned is employed, which can be dropped by the driver at this moment or may be retained horizontally to allow the accumulation of two or more sheaves before dropping.

Upon one side of the needle-standard is mounted a bracket, Q, supporting a roller, $q$, of india-rubber, or even of hard material. To this bracket is hinged a cap-piece, $q'$, carrying in its overhung arm a second roller, $q^2$, of rubber or other material, resting upon and opposing the first. A rod, $q^3$, passes through the bracket-arm and opposing arm of the cap, and receives a coiled spring, $q^4$, by which it draws them forcibly together. A nut upon the screw-threaded end of this rod serves to adjust the tension of the spring, and to increase or decrease the force of the pressure between the rolls.

From the overhung cap-piece or arm, inside of the rollers, depends an eye-piece, $q^5$, having its eye behind and on a level with the entrance between said rolls. The opposite side of the needle-standard is extended to nearly the height of the rolls, and is there provided with a guide-eye, $q^6$, and anti-friction roll, and the head of the needle itself also has an eye, $q^7$, crowned by an anti-friction roll having space beneath for the cord to pass freely. The cord is drawn from a spool, $Q'$, or cord-box mounted in any suitable position—in the present instance mounted upon the overhung arm of the binder-frame—thence is led to the guide-eye behind the tension-rolls, from that is passed between the rolls through the eye in the head of the needle, then through the guide-eye on the opposite side of the needle-standard, from thence is carried through the end of a spring take-up, $Q^2$, and, finally, entering an eye, $q^8$, in the needle-standard on a level with the point where the needle-eye rests when the latter is up, is threaded into said needle and is ready to be carried to the holder thereby in its descent. When the end of the cord is once secured in the holder, it is evident that each descent of the needle-arm will pull slack from the spool or cord supply to be paid out in the succeeding rise after the end of the cord is grasped afresh in the holder, and also that if there is unnecessary slack in the cord stretched between the holder and the eye of the needle it will in such movement be taken up and a tight band made.

The knotting, holding, and cutting devices, and the mechanism for actuating them, resemble in general features those described and claimed in Letters Patent granted to me on the 14th day of March, 1882, and numbered 254,879; but certain modifications and improvements have been introduced looking toward a reduction in number of parts, greater simplicity and accuracy, and a positive action. The gear and cam wheel R at the foot of the vertical shaft inclosed within the binder-frame standard has the overhung segment-rack $r$, substantially as heretofore; but beyond this rack, has on either side two delay-sections $r'$, which act upon delay-shoes $r^2$ on the end of the knotter-spindle R' outside the beveled pinion $r^3$ upon said spindle and driven by the rack. The spindle with its attachments is laid upon a radius from the axis of the gear and cam wheel trending obliquely past the point at which the needle enters the knotting-casing, thus economizing space in the construction of said casing and causing a more effective action of the looping-finger in the knotting operation. Two gear-teeth, $r^4$, are arranged upon the face of the gear and cam-wheel diametrically from its overhung rack and opposite an opening left between the adjacent ends of the delay-ledges, and these teeth serve to give the slight reverse motion to the knotter-spindle in order to bring it in position to receive the cord from the binding arm or needle, it having necessarily been thrown beyond that point by the overhung segment in completing the last knot. The knotter-spindle is made tubular toward its outer end, receiving a hooked rod, $R^2$, to be projected, seize the ends of the cord after they have been crossed over the loop, and draw them within the tube. A pin, $r^5$, from this rod passes through a longitudinal slot in the side of the tube and enters a sleeve, $R^3$, such as formerly used by me, except that it has two circumferential flanges, and by this sleeve, as it is pushed back and forth along the spindle, the hooked rod is made to reciprocate at the proper times. Beyond the sleeve is a thimble, $R^4$, sliding upon the squared portion of the spindle and capable of being moved therealong until it comes flush with the end. This thimble has near its base a circumferential groove receiving its impelling device and permitting it to turn, and is slotted longitudinally from its end to the wall of this groove and clear down to the central bore. A lug, $r^6$, rises from the spindle inside the slotted way in the thimble at such a point that its exterior will be no more than flush with the end of the thimble when the latter is retracted, and to this lug is pivoted a finger, $R^5$, of the shape substantially as shown, and having a curved slot, $r^7$, along its length, in which plays a pintle passing through it from the thimble, the effect of this being that when the thimble is first projected the finger will be closed down upon the cylindrical end of the tube, and held there as long as the thimble retains its position; but in the second or onward outward movement the finger, hereinafter called the "looping-finger," will be slightly opened to permit the escape of the loop pushed from the knotter-spindle in such movement. Then as the thimble is withdrawn the finger will necessarily close again and remain closed until the thimble has nearly returned to its starting-point; but when the thimble is entirely retracted, the finger will have been again raised to a nearly-vertical position, so that the cord may be laid against the side of the tube without interference from it. This differs, it will be observed, from the former construction in that the finger therein was pivoted to the thimble, and its heel end was acted upon by a cam-lug projecting from the tube or spindle and by a spring fixed to the thimble. Therefore the finger in closing down upon the tube did not do so from a relatively fixed point, but was moved longitudinally at the same time its pivotal movement was taking place, giving it a resultant oblique movement toward the end of the tube, and causing it in the final or stripping advance to be projected beyond the end of said tube. Underneath the gear and cam wheel has two continuous cam-grooves, S and S'. The first or inner one erates the sliding holder-bar $S^2$, and is for that purpose made with a track, $s$, embracing the axis of the wheel and of substantially horseshoe shape to give the retreating and advancing movement to the bar, with its horns united by a communicating track, $s'$, described on an arc concentric with said axis to hold the bar stationary while the cord is clamped. This bar for a portion of its length is half-width only, to permit a second shorter bar, $S^3$, to lie alongside of it, which second bar is operated from the outer groove, these grooves serving entirely to both project and retract the sliding bars. Said bars rest upon the bottom plate of the knotter-casing, and above them is placed, so as to slide upon their upper surfaces, a third sliding bar, $S^1$, forming a member of the cord-cutter, having an anti-friction roll at its heel end, which rests against the peripheral cam-track $S^5$, so that said bar will be projected by the motion of the gear and cam wheel. At a point near its heel end this cutter-bar has a mortise, which receives a pin, $s^2$, from the holder-bar beneath, whereby, although the cutter-bar may play sufficiently independently of the holder-bar, it will be retracted after its roller has passed the return-incline $s^3$ of the peripheral track, when said holder-bar is positively withdrawn by the action of the closed cam-groove S, and thus brought again into position with its anti-friction roll against the track, where it will be held by a yielding spring-catch, $s^4$, entering a rounded notch in its side ready for a fresh forward movement when again positively urged. On the other side of said cutter-bar and in its body is formed a long slot, $s^5$, through which rises a lug, $s^6$, from the short sliding bar $S^3$, this lug entering the circumferential groove upon the sleeve of the hook-rod, and thereby determining its to and fro motions as the bar is moved by the action of its cam. At its extreme front end the cutter-bar has secured to it a knife-blade, $S^6$, formed with a finger, $s^7$, projecting at one side of and beyond the cutting-edge, which finger, sliding over the fixed cutting-blade $S^7$, stops the cord from escape past the two, and insures its being certainly cut. The heel of the fingered blade is turned up to form a flange, $s^8$, or else a lug projects from the sliding bar at this point, entering into the groove in the thimble, so that the thimble shall receive its movements from said cutter-bar as the latter reciprocates. The peripheral track operating the cutter-bar has three rises, 1 2 3, the first of which projects it only far enough to close the looping-finger by the movement of the thimble. The second, acting after the loop had been formed and the crossed ends seized by the hook and withdrawn into the tube, carries the thimble farther forward until it comes flush with both the end of the looping-finger and of the tube, thus stripping the loop certainly from the tube, the shape of the cam-slot in said finger, as before stated, being such that at the proper moment in the forward movement of the thimble the finger is opened sufficiently to allow the escape of said loop from beneath it, and the third movement, which necessarily carries the thimble yet a little farther, but without any functional action, serving to sever the ends of the cord against the fixed cutting-blade. The bar which actuates the cord-hook is at the moment of starting in the arc section $t$ of its track and close to the entrance to the retreating section $t'$ with the hook projecting from the end of the tube, as it has remained since it moved out to release the ends of the last knot. When the gear and cam wheel starts, the hook is at once withdrawn within the tube by the re-entering portion of the track and remains withdrawn after it reaches and while it is within the second arc section, $t^2$, which is farther within the periphery of the wheel than the first; but at the end of this section the track flares outward, projecting the hook quickly to seize the ends of the cord, which at this moment have been crossed over the loop and are about to be deflected by the looping-finger. Then it is at once withdrawn by the re-entering incline $t^3$, but only so far as to just hold the ends within the tube, after which it becomes momently stationary while the cutter-bar is receiving its second motion from the incline 2 opposite that portion of the cam-groove in which the roller of the hook-bar is now traveling to push the thimble forward and strip the loop from the tube. As soon as this is done, the hook is sharply withdrawn deep into the tube by the last re-entering portion, $t^4$, of its groove or track, and as it again stops the cutter-bar is given its terminal movement by the third incline of the peripheral track to sever the cord, and the roller on the end of the hook-bar enters the final return section, $t^5$, of its own track and regains the arc from which it started, projecting the hook and releasing the knot. The yielding holder-block U is seated against a spring, U', and occupies the same position as in the previous machine; but in order to adjust the pressure of this spring against it said spring is made of tempered plate-steel, and is pivoted to the bed-plate or casing at one end, and provided in addition to the long arm $u$, which presses against the holder-block, with a second short or heel arm, $u'$, returning upon the former, but seated against a set-screw, $u^2$, in the end of the casing, whereby it can be forced with greater stress toward the block, when desired. Some changes are made also in the block. It meets the sliding holder-bar in the same manner as before, and the cord is clamped between the two, both strands of it, as long as they are in contact. Beneath their meeting-point the block has two fingers, $u^3$ $u^4$, the lower longer than the other, which embrace between them a metallic loop or horse-shoe, $u^5$, forming a continuation of the cord-slot. The longer finger—the one beneath this loop—has a gathering projection on the side nearest the binding-arm. As long as the sliding bar is in contact with the holder-block, clamping the cord, pushing said block back against the force of the spring, the two fingers of the block are withdrawn from the shoe or bow, leaving the cord-slot free, and the cord will be pushed to the very end of said slot or bend of the bow by the lower cord-placer; but when the sliding holder-bar retreats after the binding operation the holder-block will be pushed forward concurrently by the force of its spring, and the two will remain in contact with each other, clamping the cord until said block reaches the extreme of its forward movement, at which time its long finger will first have gathered in the cord lying at the bottom of the slot, and the two fingers together will have clamped it over the edges of the bar, when it will be securely held until the next binding operation. The cord-placers $U^2$ $U^3$ are both attached to the squared ends of a single spindle, $u^6$, passing through the bearing of the knotter-head. The upper one, which carries the band against the knotting-tube, simply turns with said spindle. The lower one, also fast to the spindle, has a longitudinal slot, $u^7$, into which takes a pin, $u^8$, from the sliding holder-bar. Thus as the holder-bar plays back and forth it actuates both cord-placers, opening them or closing them and holding them in fixed position.

To the side of the knotting-case at the inner end of the cord-slot and above the knotter is pivoted a fork, V, the tines of which normally overlie the cylindrical end just in advance of the thimble. An arm, v, from this fork extends to and by means of a pin or projection takes into the circumferential groove on the thimble, so that when the thimble moves, the fork will move concurrently and retain the same relation in advance thereof. The upper cord-placer forces the strands of cord which it gathers down into the neck of this fork, and when the thimble makes its first advance, they are carried by it and directed so that the looping-finger shall certainly close upon them. In the second advance of the thimble to strip the loop the fork again carries the cord between the bound sheaf and the knot in advance, and aids in stripping it and particularly in tightening it.

To briefly recapitulate the operations of the binding apparatus, the grain delivered upon the platform is carried by the platform-rakes toward the packers. Reaching them it is seized and fed, wisp by wisp, forcibly against the tripping-arm, which yields as the grain accumulates, until the trip is started. Then the binding-arm comes down, the packers cease their action, the compressor acts, compressing the gavel to its greatest extent after the binding-arm or needle has ceased its motion, and thus affording slack for the knotter in its revolution. The knotter which has first made a short reverse movement as the binding-arm was descending, now receives the strands forced in against its tube by the cord-placers, which are actuated by the advance of the sliding holder-bar to clamp the cord against the holder-block, this movement releasing the old end of the cord from the grasp of said block and taking a fresh grasp upon it alongside of the new end, which is as yet not seized for permanent holding. Now, the knotter begins to revolve, the loop is formed in manner well known, and the ends are deflected from the looping-finger to be seized by the reciprocating hook, which is at this moment projected by means of its sliding-bar and cam-groove. Next, these ends are withdrawn, the cutter advanced to push the thimble and strip the loop from the tube, then with a further advance severs the cord, the sliding holder-bar begins to retreat, and a fresh or permanent grasp upon the spool-cord is taken by the holder-block as it follows said bar. Finally, the binder-arm rises, the binding mechanism is thrown out of gear by the resetting of the trip, and the packers in the same moment commence again to feed grain toward the tripping-arm.

I claim as my invention—

1. The combination, substantially as hereinbefore set forth, of the platform, the wheel-frame behind said platform, the carrying-wheels and their axle from which the wheel-frame is hung, the thrust-tongue fixed to said axle, the caster-wheel supporting the rear end of said tongue and provided with a tiller, the driver's stand upon the tongue in front of said wheel, the vertical post from the axle, the truss-frame bridging the tongue from the continuous rear sill of the wheel-frame, the tilting-lever hooking into said post and resting upon the apex of the truss-frame, and the standard upon the tongue along which said lever may be secured to hold the platform at any desired inclination.

2. The combination, substantially as hereinbefore set forth, of the platform, the cutter crank-shaft at its inner end by which the rakes are driven, the wheel-frame rigid with said platform, the carrying-wheels and their axle from which said frame is suspended, the thrust-tongue fixed to said axle and supported at its rear by a caster-wheel, and having a driver's stand, the tilting-lever, the prime pinion-shaft extending from wheel to wheel, and having a pinion at each end meshing with the gear upon the adjacent wheel, and the counter-shaft driven from said prime pinion-shaft by beveled gears and driving the cutter crank-shaft by a gear and pinion.

3. The combination, substantially as hereinbefore set forth, of the platform, the cutter crank-shaft at the inner end thereof serving to drive the rakes, the wheel-frame with which said platform is rigid, the carrying-wheels and their axle from which said frame is suspended, the thrust-tongue fixed to the axle and supported by a caster at its rear end, and having a driver's stand in front of said caster, the tilting-lever, the prime pinion-shaft extending from one carrying-wheel to the other and having a pinion at each end meshing with gears on said wheels, the counter-shaft driven by beveled gearing from said prime pinion-shaft, and driving the cutter crank-shaft directly, the clutches upon the prime pinions, their spring-pressed controlling-rods meeting beneath the tongue, the sliding wedge-piece passing through the slotted heads of said rods, and the link connecting it with a treadle or foot-piece in front of the driver's stand.

4. The combination, substantially as hereinbefore set forth, of the platform, the wheel-frame, the carrying-wheels and their axle from which said frame is hung, the thrust-tongue and caster, the driver's stand, the tilting-lever, the prime pinion-shaft extending from wheel to wheel, and having pinions meshing with gears on each wheel, the counter-shaft driven from said prime pinion-shaft by beveled gears, the sliding clutch-halves engaging with the prime pinions, the spring-pressed rods extending from said clutch-halves toward the center of the machine, and there meeting each other and overlapping, the wedge-piece passing through the slotted heads of said rods at their overlapping-point, the link connecting it with a treadle in front of the driver's stand, and the spring-pawl snapping over the toe of such treadle that it may be kicked out of engagement by the driver.

5. The combination, substantially as hereinbefore set forth, of the low-level platform, the binder-frame sliding transversely along its delivery end, the wheel-frame, the carrying-wheels and their axle from which said frame is hung, the thrust-tongue fixed to said axle and supported at its rear by a caster-wheel, the driver's stand on said tongue, and a lever system whereby the driver on his stand may move the binder-frame back and forth to accommodate longer or shorter grain.

6. The combination, substantially as hereinbefore set forth, of the low-level platform, the binder-frame sliding transversely along the delivery end of said platform, the wheel-frame, the carrying-wheels and their axle from which said frame is hung, the thrust-tongue fixed to said axle and supported at its rear by a caster-wheel, the driver's stand on said tongue, the tilting-lever operated from said stand, and a second lever alongside said stand link-connected with the binder-frame, whereby the driver may tilt the platform or move the binder back and forth to accommodate longer or shorter grain.

7. The combination, substantially as hereinbefore set forth, of the low-level platform, the binder-frame arranged to slide transversely along the delivery end thereof with its table flush with said end, the wheel-frame with which said platform is rigid, the carrying-wheels and their axle supporting said frame, the thrust-tongue fixed to said axle and supported at its rear by a caster-wheel, the tilting-lever, the standard in front of the driver's stand along which said lever locks, and the second lever pivoted to said standard and latching into a rack borne thereby, the sliding bar arranged in keepers along the tongue and moved by said second lever, the link from the binder-frame, and the intermediate lever connecting said link with the end of the sliding bar whereby the driver can adjust the binder-frame by manipulating the upright lever in front of his stand.

8. The combination, substantially as hereinbefore set forth, of the low-level platform, the binder-frame sliding along the delivery end of said platform and having its table flush therewith, the wheel-frame, the carrying-wheels and their axle from which said frame is suspended, the thrust-tongue fixed to said axle and supported by a caster at its rear end, the driver's stand carried by said tongue, the tilting-lever extending to said stand, the upright lever in front of said stand for moving the binder-frame, the treadle and its connections for throwing the gearing into and out of engagement pivoted to the tongue to bring its foot-piece also just in front of said stand, the second treadle pivoted to the tongue on the opposite side from the other, the linked elbow-lever and dog which it controls, and the sheaf-board which said dog locks in position.

9. The combination, substantially as hereinbefore set forth, of the low-level platform, the binder-frame sliding along the delivery end of said platform and having a table flush therewith, the wheel-frame rigid with the platform, the carrying-wheels and their axle, from which said frame is hung, the thrust-tongue and its caster-wheel, the tilting-lever, the prime pinion shaft driven by both carrying-wheels, the counter-shaft driven from said prime pinion-shaft, the cutter crank-shaft which said counter-shaft drives, the sliding sprocket-wheel on the counter-shaft, the arm from the binder-frame yoked to said sprocket-wheel, and the chain communicating motion from said sprocket-wheel and counter-shaft to the binder-shaft.

10. The combination, substantially as hereinbefore set forth, of the platform, the binder-frame sliding along its delivery end and having a table flush therewith, the wheel-frame rigid with the platform-frame, the carrying-wheels and their axle from which said wheel-frame is suspended, the thrust-tongue fixed to said axle, the caster-wheel and driver's stand, the tilting-lever, and mechanism for moving the binder back and forth operated from said stand, the prime pinion-shaft extending from one carrying-wheel to the other and having pinions meshing with gears upon both, the counter-shaft driven from said prime pinion-shaft by beveled gears and directly driving the cutter crank-shaft or rake shaft of the platform, the sliding sprocket-wheel on said counter-shaft, the arm from the binder-frame yoked to said sprocket-wheel to move it concurrently, and the chain belt running from the sprocket-wheel to a second sprocket-wheel on a parallel shaft, and thence communicating motion to the binder.

11. The combination, substantially as hereinbefore set forth, of the platform, the binder-frame at its delivery end arranged to slide transversely thereof, the wheel-frame to which said platform is rigidly attached, the carrying-wheels and their axle from which said frame is suspended, the thrust-tongue fixed to said axle and supported at its rear end by a caster-wheel having a tiller to guide the machine, the tilting-lever and the lever for adjusting the binder-frame, both having their hand-holds adjacent to the driver's stand at the rear end of the tongue, the prime pinion-shaft having pinions at each end meshing with gears upon the carrying-wheel at such ends, the clutches to said pinions, and the treadle in front of the driver's stand for retracting said clutches, the counter-shaft driven from said prime pinion-shaft by beveled gearing and driving the cutter crank-shaft directly, the sliding sprocket-wheel upon said counter-shaft controlled by a rigid arm from the binder-frame, and the chain communicating motion from said sprocket-wheel to the sprocket-wheel borne upon the binder-frame, and ultimately to the binding mechanism.

12. The combination, substantially as hereinbefore set forth, in a thrust-cut harvester, of the wheel-frame suspended from the axle, the thrust-tongue fixed to said axle, the post braced from the axle and tongue and mortised near its head, the bolt passing through said post and through the upper part of the mortise and securing the ends of two of the brace-rods, and the tilting-lever notched on the upper edge of that end which enters the mortise to catch over the bolt.

13. The combination, substantially as hereinbefore set forth, in a thrust-cut harvester, of the wheel-frame, the carrying-wheels and their axle, the tongue fixed to said axle, the post rising from the axle at the junction of the tongue and mortised at its head, the brace-rods extending from the axle and from the tongue to the head of the post, the bolt securing the upper ends of the brace-rods from the axle and passing through the top of the mortise, the truss or bridge rising from the rear sill of the frame over the axle, the keeper at the apex of said truss, and the notched tilting lever taking into the mortise and over the bolt and resting within said keeper upon the anti-friction roll at the bottom thereof.

14. The combination, substantially as hereinbefore set forth, with the grain-platform and binder, of the sheaf-board at the outer end of the platform-frame or on the stubble side of the binder, the shaft to which said board is fixed, the winding spring around the shaft, the crank-arm on the end of said shaft, and the dog catching over the end of said crank-arm.

15. The combination, substantially as hereinbefore set forth, with the grain-platform and binder, of the hinged sheaf-board fixed to its pivot-rod or shaft, the winding spring around said shaft tending to constantly close the board to a vertical position or in toward the binding apparatus, the crank-arm on the end of said shaft, and the dog to hold it against the pressure of the sheaves, and the removable bolt serving as a stop against the crank-arm to prevent the board from rising above the horizontal, but removable to permit it to close for transportation.

16. The combination, substantially as hereinbefore set forth, of the platform, the binder-frame adjustable transversely along the delivery end of said platform, the wheel-frame behind the platform and rigid therewith, the carrying-wheels and their axle, the thrust-tongue and its caster, the prime pinion-shaft driven from said carrying-wheels, the counter-shaft driven directly by the prime pinion-shaft, the sliding sprocket-wheel on said counter-shaft, controlled by a rigid arm from the binder-frame, the chain belt passing from said sprocket-wheel over a sprocket-wheel on the packer-shaft supported from the binder-frame, and a second chain belt passing from another sprocket-wheel on said packer-shaft over a sprocket-wheel on the needle-shaft of the binder to drive said binder.

17. The combination, substantially as hereinbefore set forth, of the pivoted tripping-arm vibrating in a slotted guideway, the spring-pressed block against which it bears, the pivoted lever-arm bent or inclined to cross said slotted way behind the block, the pin or roller from said block bearing against the inner face of the lever-arm, and the link from the free end of said arm extending to the immediate tripping instrumentalities, whereby as said lever is forced aside by the retreat of the tripping-arm before the incoming grain it will actuate the trip, causing the binder to start in motion.

18. The combination, substantially as hereinbefore set forth, to form a trip for binders, of a sliding clutch-half, a spring-pressed bar to which it is yoked and which forces it constantly into engagement with its opposite, a sliding bar alongside the spring-pressed bar carrying a pawl which takes over the projection on said latter bar, an arm from the pawl-bar, and a cam-collar on the shaft (which is set in motion by the engagement of the clutch) acting upon said projecting arm so as to retract the pawl-bar after the pawl has snapped over the projection on the clutch-bar.

19. The combination, substantially as hereinbefore set forth, to form a trip for binders, of a sliding clutch-half engaging with a constantly-driven wheel and itself splined to the shaft upon which the wheel turns loosely, a spring-pressed bar yoked to said clutch-half and serving to carry it into engagement, a pawl-carrying bar alongside the clutch-bar and also spring-pressed in the same direction, a stop upon the clutch-bar over which the pawl catches when the two bars are at the extreme of their forward movement, an arm projecting from the pawl-bar over the shaft, and a cam-collar on said shaft against one face of which the arm rests, and of such outline that it permits the pawl-bar to move forward during the revolution of the shaft, but at the end of the revolution forces it back with the clutch-bar over which its pawl has snapped, thereby disengaging the clutch until the pawl is again moved to release the clutch-bar.

20. The combination, substantially as hereinbefore set forth, of the pivoted tripping-arm receiving the grain from packing devices, the spring-pressed block against which it bears, the bent lever forced aside by said block as it retreats, the link extending from the free end of said lever to the heel end of a spring-pawl, the spring-pressed sliding bar in which said pawl is pivoted, the arm from said bar resting against one face of a cam-collar on the shaft to be started, the spring-pressed clutch-bar lying alongside the other, and the sliding clutch to which it is yoked, and the projection on said clutch-bar over which the pawl catches, whereby the clutch will be released and caused to engage by the retreat of the tripping-arm before the accumulating gavel.

21. The combination, substantially as hereinbefore set forth, of the needle-shaft, the wheel mounted loosely thereon, the packer-shaft, and the driving-wheel thereon also mounted loosely and driving the wheel on the needle-shaft constantly, tripping devices to clutch and unclutch the wheel on the needle-shaft from said shaft, a cam-collar on said needle-shaft which revolves whenever the shaft revolves, a sliding clutch on the packer-shaft engaging with the driving-wheel thereon, and a lever yoked at one end to said sliding clutch and at the other resting against one face of the cam-collar on the needle-shaft, whereby the packer-shaft will be thrown out of action after the binder-arm starts and brought again into action at or before the time that the binder-shaft stops.

22. The combination, substantially as hereinbefore set forth, of the loose wheel upon the binder-shaft, the loose wheel upon the packer-shaft driving the wheel on the binder-shaft and itself driven constantly, sliding clutches on the respective shafts adapted to engage with said wheels, a spring-pressed bar yoked to the clutch on the binder-shaft and tending to carry it into engagement, a spring-pressed pawl-carrying bar lying alongside the first with its pawl arranged to take over a projection thereon, a tripping-arm actuated by the accumulation of the grain and intermediately connected with said pawl, so as to release it from the stop or projection as the limit of the gavel is reached, an arm from the pawl-bar extending over the binder-shaft and resting against one face of a cam-collar thereon, and a spring-held lever yoked at one end to the clutch on the packer-shaft and at the other pressing against the opposite face of said cam-collar, the outline of which is such that the pawl-bar will be allowed to move forward while the shaft is revolving that its pawl may catch the clutch-bar and at the end of a revolution will be drawn back to retract said clutch-bar and the clutch, and that the packer-lever will be forced out against the stress of its spring to disengage the packer-shaft after the binder-shaft has started, and will be released by a depression in said collar at or before the time that the binder-shaft stops.

23. The combination, substantially as hereinbefore set forth, of the platform, the binding-table, the packer-shaft overhanging the delivery end of the platform, the series of cranks thereon, the packer-arms pivoted to said cranks near their front ends and provided with curved teeth along their length a part of the distance, and the vertical guideways for the heels of said packer-arms arranged on the other side of the binding arm or needle and elongated to permit the packer-arms to rise in their forward movement if they strike accumulating grain.

24. The combination, substantially as hereinbefore set forth, of the tripping-arm, the hinged bar x, to which it is pivoted, the ledge or shoulder against which said bars rest normally in a horizontal position, and the pawl or dog carried by the needle to raise said hinged bar as the needle rises to permit the bound sheaf to be pushed on.

25. The combination, substantially as hereinbefore set forth, of the needle, its lateral offset, the compressor pivoted to said offset, the link pivoted to the compressor, the slotted lever with which said link connects, and the wrist-pin from a rotating crank taking into said slot to actuate the compressor.

26. The combination, substantially as hereinbefore set forth, of the binder arm or needle, the cam-slotted transverse bar attached thereto, the lateral offset from said needle, the compressor pivoted to said offset, the link connecting the compressor with the shorter arm of a slotted lever also pivoted to the needle, and the wrist-pin from the crank at the end of the binder-shaft passing through both slotted lever and cam-bar, to actuate both the needle and the compressor in true relation.

27. The combination, substantially as hereinbefore set forth, of the separator-arm, the swiveling guide in which its heel end plays, the link connecting its body with a wrist-pin on a rotating crank, the roller carried by said separator-arm, and a guideway for said roller, whereby the point of the separator-arm is given an orbital movement.

28. The combination, substantially as hereinbefore set forth, of the separator-arm, the swiveling guide in which its heel end plays, the link connecting its body with the wrist-pin on a rotating crank, the roller which it carries, the long cam-track over which said roller travels as the separator-arm is drawn up by the movement of the crank, a lower cam-track over which it passes when being projected, and a switch between the two cam-tracks.

29. The combination, substantially as hereinbefore set forth, of the needle, the cam-slotted bar attached thereto, the separator-arm, the swiveling guide in which its heel end plays, the roller which it carries and the camway for guiding said roller, and a wrist-pin from the needle-shaft crank taking into the slotted bar on said needle and directly connected by a link with the body of the separator-arm, to impart motion to both.

30. The combination, substantially as hereinbefore set forth, of the needle, the cam-slotted bar attached thereto, the lateral offset from said needle, the compressor pivoted to said offset, the link connecting the compressor with the shorter end of a slotted lever, also pivoted to said needle, the separator-arm, the swiveling guide for its heel, its cam-tracks and their communicating switch, and the wrist-pin from the crank on the end of the rotating binder-shaft receiving a link from said separator-arm and passing through the slotted lever and cam-bar, whereby the needle, compressor, and separator are actuated by the revolutions of the single wrist-pin, preserving their proper relations and concordance.

31. The combination, substantially as hereinbefore set forth, to form a tension device for cord-binders, of a bracket supporting a rubber roll, a hinged cap to said bracket supporting a second opposing roll, a guide-eye suspended behind the two rolls to direct the cord therebetween, a rod passing through the outer jutting arm of the bracket and through the overhanging arm of the cap and having around it a coiled spring to draw the two together and press one roll upon the other, and a nut upon the screw-threaded end of said rod to increase or decrease the force of the pressure exerted by the spring.

32. The combination, substantially as hereinbefore set forth, to form a slack device for grain-binders, of a reciprocating needle, a guide-eye or anti-friction roll at the top of said needle, and cord-guides on each side of the way in which it reciprocates and at the head thereof, through which and the intermediate guide-eye in the needle the cord is carried on its way to the needle-eye and to the holder, all arranged in such manner that as the needle descends to encircle a gavel a slack-length will be drawn from the spool and any slack about the bundle be taken up, and as the needle ascends it will pay out such slack-length without strain upon the holder.

33. The combination, substantially as hereinbefore set forth, of the tripping-arm, the long guide-slot in which it moves, the rod lying alongside and parallel with said slot and having an encircling-spring, a nut working upon the screw-threaded end of said rod and forming one seat for said spring, the block playing along said slot and resisting the retreat of the tripping-arm, and the spur or finger from said block collared to and guided by said rod at the other end of the spring, which is compressed as the block retreats.

34. The combination, substantially as hereinbefore set forth, of the knotter, its retracting cord-hook, the sleeve connected with said hook, the revolving gear and cam wheel, its cam-groove receiving a roller from a bar yoked to the sleeve upon the knotter-spindle and acting to retract and project the cord-hook at the proper times, the gear-section overhanging the opposite face of the wheel and engaging with a pinion on the end of the knotter-spindle, the delay-ledges on the face of said wheel, delay-shoes on the end of the knotter-spindle beyond the pinion riding upon said ledges to hold the knotter against rotation, and the reversing-teeth opposite a gap between said delay-shoes to reset the knotter in position to receive the cord at the proper interval before it receives its effective revolution.

35. The combination, substantially as hereinbefore set forth, of the knotter-spindle, the retracting hook or cord-hook playing in its tubular outer end, the sleeve upon the spindle whereby said hook is moved, the bar yoked to said sleeve and having a pin or an anti-friction roll at its other end, the gear and cam wheel having a continuous cam-groove in one face to receive said pin or anti-friction roll from the sliding bar and move the sleeve to project and retract the cord-hook as the wheel revolves, a sliding thimble on the end of the knotter-spindle and revolving therewith, a looping-finger operated by said thimble to close over the strands of cord and deflect them as the knotter revolves to form the loop, a sliding bar connected with said thimble and actuated by a peripheral cam-track on the revolving wheel to project the sleeve successively, first to close the looping-finger over the cord and next to push the loop off of the end of the spindle, and gearing and delay devices on the opposite face of the wheel operating to revolve the knotter and to reset it in position for action in proper concord with the action of the other instrumentalities enumerated.

36. The combination, substantially as hereinbefore set forth, of the knotter-spindle, its tubular effective end, the cord-retracting hook playing therein and suitably actuated, the slotted thimble revolving with and moving upon the end of the spindle, the looping-finger pivoted to a lug from the spindle within the slot in said thimble and having a cam-slot, as described, and the pintle passing from the thimble through said slot, whereby as the thimble is successively projected it will operate, first, to close the finger, and next to slightly open it for the escape of the loop, and when fully retracted will open said finger into a nearly perpendicular position.

37. The combination, substantially as hereinbefore set forth, of the knotter-spindle having a tubular end, the cord-retracting hook playing within said tubular part, means for projecting and withdrawing it, the slotted thimble playing longitudinally upon the spindle at its effective end, but turning therewith, the looping-finger pivoted to the spindle within said slot and having itself a curved or cam slot, the pintle passing from the thimble through the slot in the looping-finger, a sliding bar yoked to the thimble and having at its rear end an anti-friction roll, and the cam-track upon the periphery of the revolving gear and cam wheel having two successive rises and an intermediate arc section acting upon the anti-friction roll, the first rise to project the thimble sufficiently to close the looping-finger, and the second after the knotter has made its revolution to advance the thimble to the extreme end of the knotter-spindle and of the looping-finger, slightly opening the finger and pushing the loop from the spindle.

38. The combination, substantially as hereinbefore set forth, of a knotter-spindle, a cord-hook playing therein, a looping-finger pivoted to said spindle, and an advancing and retreating thimble playing along the end of said spindle, and to the end of the looping-finger, and serving in its advancing motion to first close and then to open said looping-finger, and finally to push or strip the loop from the spindle.

39. The combination, substantially as hereinbefore set forth, of the spring-seated holder-block, the sliding holder-bar and its anti-friction roll, the revolving wheel having a continuous cam-groove into which said roll takes, whereby the holder-bar is carried against the holder-block to clamp the cord and held fixed thereagainst for a definite period, the fingers upon the holder-block, the longest beneath the other, and having a gathering projection, and the cord-receiving bow arranged in the space between the paths of such fingers, whereby the cord-strand within said bow will be clamped by said fingers as the holder-block is urged forward by its spring when the bar recedes.

40. The combination, substantially as hereinbefore set forth, of the spring-seated holder-block, the sliding holder-bar urged thereagainst by a cam to take a primary grasp upon the cord, the cord-bow forming the termination of the cord-slot, the cord-placer working beneath said bow to carry the cord to its base, and the fingers projecting from the holder-block to come, one on either side of the bow, as the block is forced forward by its spring when the bar retreats to take the final grasp upon the spool-strand before it is released from the primary grasp imparted by the bar.

41. The combination, substantially as hereinbefore set forth, of the sliding holder-bar, the cord-placers, one above and one beneath the knotting-head, fixed to the same spindle, and the pin from said holder-bar taking into an elongated slot in the lower cord-placer, whereby said cord-placers will both be operated by the advance of the holder-bar.

42. The combination, substantially as hereinbefore set forth, of the knotter-spindle, the cord-hook playing therein, the thimble moving upon a squared section near the end of said spindle and capable of being advanced to come flush with the extreme end, the sliding cutter-bar underlying said knotter and having a vertical flange which enters a groove in the thimble, the anti-friction roll at the inner end of said cutter-bar, and the revolving wheel having a peripheral track against which said anti-friction roll rests, and provided with three successive rises—the first to advance the thimble to close the looping-finger, the second to further advance the thimble to the end of the tube to strip the loop therefrom, and the third to give said cutter-bar its own effective stroke to sever the cord.

43. The combination, substantially as hereinbefore set forth, of the knotter-spindle, the cord-hook playing therein, the thimble and looping-finger operated thereby, and the fork above the cylindrical end of said spindle connected with the thimble by an arm and receiving the cord-strands to retain them in position for the grasp of the looping-finger and to direct them as the thimble is moved.

44. The combination, substantially as hereinbefore set forth, with the knotter-spindle, its retracting-hook, the looping-finger and thimble, and the cord-fork moved by said thimble, of the upper cord-placer serving to carry the strands of cord down into the base of said fork.

45. The combination, substantially as hereinbefore set forth, of the gear and cam wheel, the cutter-bar forced outward by its peripheral track, the holder-bar projected and retracted by a continuous cam-groove, and the pin from said holder-bar entering a mortise in the cutter-bar, whereby the cutter-bar is permitted to move outward independently of the holder-bar, but is withdrawn into positon against the peripheral track of the gear and cam wheel by the holder-bar as the latter is positively retracted.

46. The combination, substantially as hereinbefore set forth, of the revolving gear and cam wheel, the cutter-bar forced out of its peripheral track, the holder-bar projected and retracted by a continuous cam-groove in the face of said wheel, the pin from said holder-bar entering a mortise in the cutter-bar to retract the latter, and the spring-stop entering a recess in said cutter-bar to hold it in position until the proper time for its movement.

47. The combination, substantially as hereinbefore set forth, of the gear and cam wheel, the sliding holder-bar projected and retracted by a continuous cam-groove in the under face of said wheel, a second bar lying alongside thereof and projected and retracted by an outer cam-groove to operate the cord-hook, the cutter-bar overlying and covering these two bars and slotted longitudinally to admit the passage of a lug connecting the second bar with the cord-hook sleeve and mortised to receive a pin from the holder-bar, and a spring-stop to hold said cutter-bar in position until its proper time for action, whereby the underlying bars are permitted to reciprocate without reference to the cutter-bar, but the cutter will be withdrawn after its reciprocation by the holder-bar.

48. In combination with the knotter and its cord-hook, the gear and cam wheel having an irregular continuous cam-groove to operate said hook, of the outline described—that is to say, having the re-entering portion which serves at the outset to withdraw the hook within the tube, then a concentric section holding it fixed in said relation while the knotter is revolving, next flaring outwardly to project the hook, and immediately after returning inwardly a sufficient distance to just withdraw the hook within the tube and hold the cord ends while the strands are being severed, next a sharp inward incline, whereby the hook is withdrawn to the extreme of its inward motion to tighten the knot, and finally a return outward to project the hook and release the knot.

49. The gear and cam wheel, constructed substantially as described—that is to say, having on one face an overhung rack, two delay-ledges, and reversing-teeth at the ends of said delay-ledges away from the overhung rack, on the other face two cam-grooves of the outline shown, and on its edge or periphery a track or way of three successive rises, with intermediate concentric portions and a returning incline.

WILLIAM LOTTRIDGE.

Witnesses:
FRANK COLLINS,
C. H. COLLINS.